(12) United States Patent
Faruque et al.

(10) Patent No.: US 12,221,059 B2
(45) Date of Patent: Feb. 11, 2025

(54) LOAD-LIMITING SEATBELT RETRACTOR

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/317,978

(22) Filed: May 16, 2023

(65) Prior Publication Data

US 2024/0383436 A1  Nov. 21, 2024

(51) Int. Cl.
 *B60R 22/347* (2006.01)
 *B60R 22/34* (2006.01)

(52) U.S. Cl.
 CPC ........ *B60R 22/3413* (2013.01); *B60R 22/347* (2013.01)

(58) Field of Classification Search
 CPC ........................... B60R 22/347; B60R 22/3413
 See application file for complete search history.

(56) References Cited

U.S. PATENT DOCUMENTS

| | | | | |
|---|---|---|---|---|
| 3,857,528 A * | 12/1974 | Fiala | ................... | B60R 22/40 242/384.6 |
| 5,211,352 A * | 5/1993 | Meyer | ................... | B60R 22/44 280/808 |
| 5,899,402 A * | 5/1999 | Koning | ............... | B60R 22/3413 242/379.1 |
| 5,961,060 A * | 10/1999 | Brambilla | ........... | B60R 22/3413 280/805 |
| 6,012,667 A * | 1/2000 | Clancy, III | .......... | B60R 22/3413 280/805 |
| 6,206,315 B1 | 3/2001 | Wier | | |
| 6,616,081 B1 * | 9/2003 | Clute | .................... | C23C 16/279 280/805 |
| 6,745,970 B2 * | 6/2004 | Wier | .................... | B60R 22/3413 242/379.1 |
| 7,410,114 B2 * | 8/2008 | Webber | ............... | B60R 22/3413 280/805 |

(Continued)

FOREIGN PATENT DOCUMENTS

| | | | | |
|---|---|---|---|---|
| DE | 102004004269 A1 * | 8/2004 | ......... | B60R 22/3413 |
| ES | 2352699 T3 * | 2/2011 | ......... | B60R 22/3413 |

(Continued)

*Primary Examiner* — Barry Gooden, Jr.
(74) *Attorney, Agent, or Firm* — Frank A. MacKenzie; Brooks Kushman P.C.

(57) ABSTRACT

A restraint system includes a retractor housing; a spool rotatably coupled to the retractor housing and defining an axis of rotation; an inner torsion bar elongated along the axis of rotation and positioned coaxially in the spool; an outer torsion bar elongated along the axis of rotation, extending coaxially around the inner torsion bar, and positioned coaxially in the spool; an engagement member selectively engageable with the outer torsion bar; and a solenoid operable to move the engagement member into engagement with the outer torsion bar and out of engagement with the outer torsion bar.

19 Claims, 9 Drawing Sheets

(56) References Cited

U.S. PATENT DOCUMENTS

| | | | | |
|---|---|---|---|---|
| 8,220,735 | B2* | 7/2012 | Wang | B60R 22/3413 |
| | | | | 280/805 |
| 8,286,903 | B2* | 10/2012 | Ogawa | B60R 22/4676 |
| | | | | 242/379.1 |
| 9,527,476 | B2 | 12/2016 | Wigstrom et al. | |
| 9,688,238 | B2* | 6/2017 | Yanagawa | B60R 22/3413 |
| 10,040,421 | B2 | 8/2018 | Jaradi et al. | |
| 10,196,034 | B2* | 2/2019 | Sasahara | B60R 22/34 |
| 10,836,347 | B2 | 11/2020 | Gray | |
| 11,554,749 | B2* | 1/2023 | Jaradi | B60R 22/3413 |
| 11,975,681 | B1* | 5/2024 | Jaradi | B60R 22/46 |
| 2003/0038202 | A1* | 2/2003 | Wier | B60R 22/3413 |
| | | | | 242/383.2 |
| 2003/0201357 | A1* | 10/2003 | Koning | B60R 22/3413 |
| | | | | 242/379.1 |
| 2006/0022447 | A1* | 2/2006 | Kohlndorfer | B60R 22/3413 |
| | | | | 280/805 |
| 2006/0124793 | A1* | 6/2006 | Keller | B60R 22/3413 |
| | | | | 242/382 |
| 2008/0061180 | A1* | 3/2008 | Webber | B60R 22/3413 |
| | | | | 242/381 |
| 2009/0057466 | A1* | 3/2009 | Choi | B60R 22/4633 |
| | | | | 242/379 |
| 2011/0000996 | A1 | 1/2011 | Wigstrom et al. | |
| 2011/0309178 | A1* | 12/2011 | Yanagawa | B60R 22/3413 |
| | | | | 242/374 |
| 2011/0309181 | A1* | 12/2011 | Yanagawa | B60R 22/3413 |
| | | | | 242/379.1 |
| 2012/0175451 | A1* | 7/2012 | Yanagawa | B60R 22/3413 |
| | | | | 242/379.1 |
| 2013/0233958 | A1* | 9/2013 | Yanagawa | B60R 22/3413 |
| | | | | 242/379.1 |
| 2017/0341625 | A1* | 11/2017 | Jaradi | B60R 22/38 |
| 2018/0297553 | A1* | 10/2018 | Takamatsu | B60R 22/405 |
| 2020/0307507 | A1* | 10/2020 | Jaradi | B60R 22/3413 |
| 2021/0229624 | A1* | 7/2021 | Jaradi | B60R 22/3413 |
| 2024/0132013 | A1* | 4/2024 | Jaradi | B60R 22/38 |

FOREIGN PATENT DOCUMENTS

| | | | | |
|---|---|---|---|---|
| JP | 2012001016 A | * | 1/2012 | B60R 22/3413 |
| WO | WO-03010030 A2 | * | 2/2003 | B60R 22/3413 |

* cited by examiner

LOAD-LIMITING SEATBELT RETRACTOR

BACKGROUND

Vehicles include restraint systems. The restraint system for a seat of a vehicle is typically a three-point harness. The restraint system includes an anchor, a retractor, and a buckle. The anchor attaches one end of the webbing to a frame of the seat or vehicle body. The other end of the webbing feeds into the retractor, which may include a spool that extends and retracts the webbing. A clip slides freely along the webbing and, when engaged with the buckle, divides the webbing into a lap band and a shoulder band.

DETAILED DESCRIPTION

Figure 1:
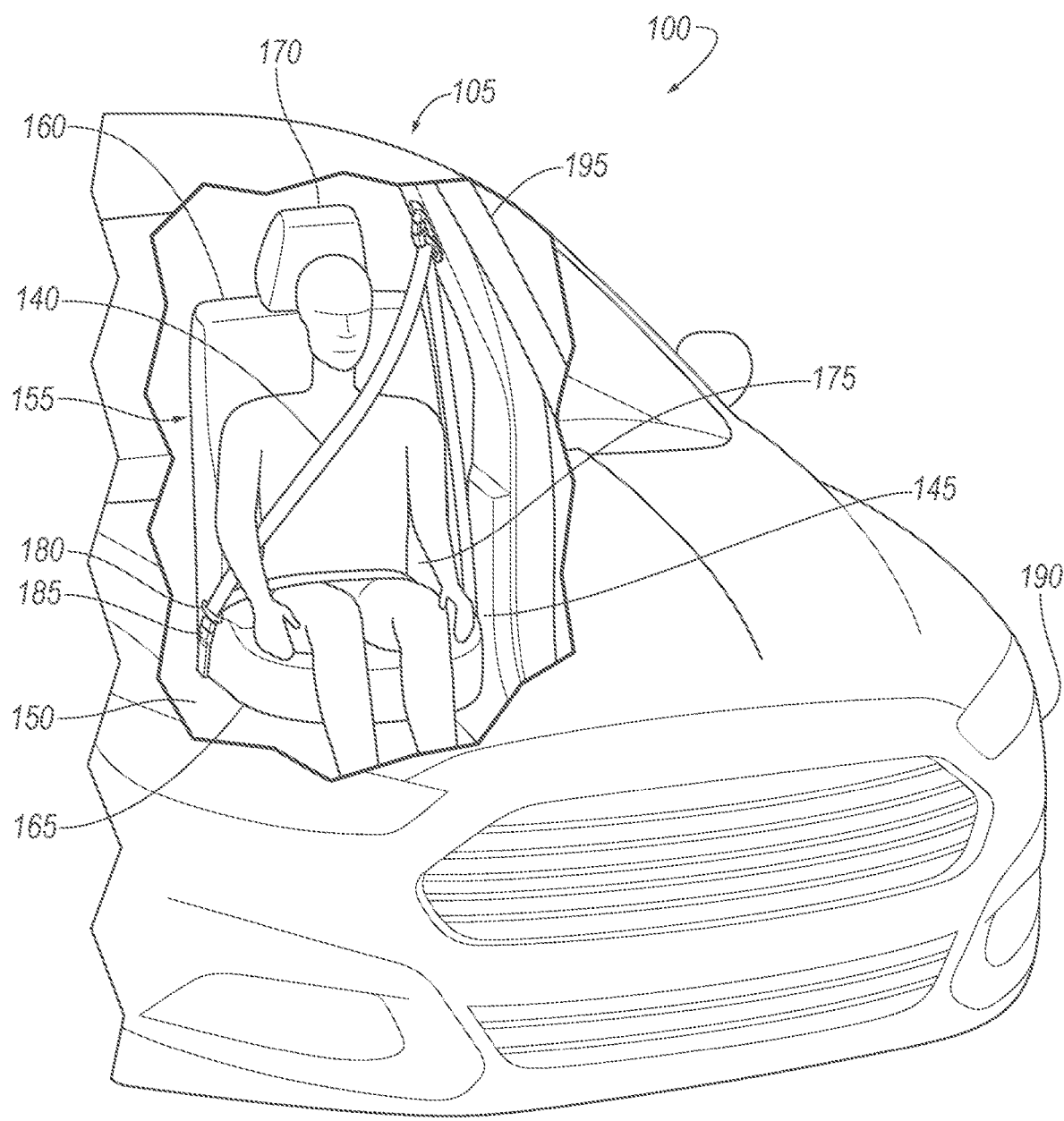
FIG. 1 is a perspective view of a portion of an example vehicle with a passenger compartment exposed for illustration.

A restraint system includes a retractor housing; a spool rotatably coupled to the retractor housing and defining an axis of rotation; an inner torsion bar elongated along the axis of rotation and positioned coaxially in the spool; an outer torsion bar elongated along the axis of rotation, extending coaxially around the inner torsion bar, and positioned coaxially in the spool; an engagement member selectively engageable with the outer torsion bar; and a solenoid operable to move the engagement member into engagement with the outer torsion bar and out of engagement with the outer torsion bar.

In an example, the outer torsion bar may be a first outer torsion bar, and the restraint system may further include a second outer torsion bar elongated along the axis of rotation, extending coaxially around the inner torsion bar, and positioned coaxially in the spool. In a further example, the engagement member may selectively engage the first outer torsion bar with the second outer torsion bar. In a yet further example, the first outer torsion bar and the second outer torsion bar may define a gap between the first outer torsion bar and the second outer torsion bar along the axis of rotation, and the engagement member may extend across the gap when engaging the first outer torsion bar with the second outer torsion bar.

In another yet further example, the engagement member and the second outer torsion bar may be shaped to prevent rotation of the engagement member relative to the second outer torsion bar. In a still yet further example, the engagement member and the first outer torsion bar may be shaped to prevent rotation of an end of the first outer torsion bar relative to the engagement member when the engagement member is engaged with the first outer torsion bar.

In another further example, the inner torsion bar may be elongated from a first end to a second end, the first outer torsion bar may be fixed to the inner torsion bar at the first end, and the second outer torsion bar may be fixed to the inner torsion bar at the second end.

In an example, the solenoid may be fixed relative to the spool.

In an example, the solenoid may be arranged to move the engagement member parallel to the axis of rotation.

In an example, the restraint system may further include a computer communicatively coupled to the solenoid, and the computer may be programmed to instruct the solenoid to move the engagement member into engagement with the outer torsion bar in response to data indicating that an occupant of a seat is above a size threshold.

In an example, the inner torsion bar may be elongated from a first end to a second end, and the outer torsion bar may be fixed to the inner torsion bar at the first end of the inner torsion bar. In a further example, the outer torsion bar may be elongated from a first end fixed to the first end of the inner torsion bar to a second end, and the second end of the outer torsion bar may be free when the engagement member is not engaged with the outer torsion bar. In a yet further example, when the engagement member is engaged with the outer torsion bar, the engagement member may connect the second end of the outer torsion bar to the second end of the inner torsion bar.

In another yet further example, the engagement member and the second end of the outer torsion bar may be shaped to prevent rotation of the second end of the outer torsion bar relative to the engagement member when the engagement member is engaged with the outer torsion bar.

In an example, the inner torsion bar may be elongated from a first end to a second end, and the first end of the inner torsion bar may be fixed relative to the spool. In a further example, the restraint system may further include a locking mechanism movable between an engaged state and a disengaged state, the locking mechanism in the engaged state may lock the second end of the inner torsion bar to the retractor housing, and the locking mechanism in the disengaged state may permit rotation of the second end of the inner torsion bar relative to the retractor housing.

In an example, the spool may include a slot, and the restraint system may further include webbing extending through the slot.

In an example, the restraint system may further include a spring coupled to the spool and coupled to the retractor housing, and the spring may be a coil spring.

In an example, the restraint system may further include a spring coupled to the spool and coupled to the retractor housing, and the spring may be preloaded to apply a torque to the spool in a retractive direction.

With reference to the Figures, wherein like numerals indicate like parts throughout the several views, a restraint system 105 of a vehicle 100 includes a retractor housing 110; a spool 115 rotatably coupled to the retractor housing 110 and defining an axis of rotation A; an inner torsion bar 120 elongated along the axis A and positioned coaxially in the spool 115; a first outer torsion bar 125 elongated along the axis A, extending coaxially around the inner torsion bar 120, and positioned coaxially in the spool 115; an engagement member 130 selectively engageable with the first outer torsion bar 125; and a solenoid 135 operable to move the engagement member 130 into engagement with the first outer torsion bar 125 and out of engagement with the first outer torsion bar 125.

The restraint system 105 provides load limiting that is customizable to the occupant. When the engagement member 130 engages the first outer torsion bar 125, both the inner torsion bar 120 and the first outer torsion bar 125 resist extraction (i.e., payout) of webbing 140 from the spool 115 in a load-limiting situation (e.g., certain impacts to the vehicle 100). When the engagement member 130 is disengaged from the first outer torsion bar 125, the inner torsion bar 120 but not the first outer torsion bar 125 resists the extraction of the webbing 140 in a load-limiting situation. The restraint system 105 is thus capable of providing comparatively higher or lower load levels in a load-limiting situation, e.g., a higher load level for a comparatively taller occupant and a lower load level for a comparatively shorter occupant. For example, the lower load level may be provided for occupants with stature equal to or smaller than a fifth-percentile adult woman or a fiftieth-percentile six-year-old. The solenoid 135 permits the engagement of the engagement member 130 to quickly change from trip to trip as different occupants use the restraint system 105, based only on data sent to the solenoid 135. Selectively engaging or disengaging the engagement member 130 may be performed automatically without actions needed from the occupant to achieve the customization due to the solenoid 135. Finally, the restraint system 105 provides for a retractor 145 that is compact and inexpensive. The retractor 145 uses a small number of components and conveniently packages several of the components, such as the inner torsion bar 120, the first outer torsion bar 125, and the engagement member 130, inside the spool 115.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 150 to house occupants, if any, of the vehicle 100. The passenger compartment 150 includes one or more of a plurality of seats 155 disposed in a front row of the passenger compartment 150 and one or more of the seats 155 disposed in a second row behind the front row. The passenger compartment 150 may also include seats 155 in a third-row at a rear of the passenger compartment 150. The position and orientation of the seats 155 and components thereof may be adjustable by an occupant. The rest of this description discusses the restraint system 105 for one seat 155, but multiple or all seats 155 in the passenger compartment 150 can each have a restraint system 105 as described herein. The seat 155 is shown to be a bucket seat, but the seat 155 may be another type.

The seat 155 may include a seat back 160, a seat bottom 165, and a head restraint 170. The head restraint 170 may be supported by the seat back 160 and may be stationary or movable relative to the seat back 160. The seat back 160 may be supported by the seat bottom 165 and may be stationary or movable relative to the seat bottom 165. The seat back 160, the seat bottom 165, and/or the head restraint 170 may be adjustable in multiple degrees of freedom. Specifically, the seat back 160, the seat bottom 165, and/or the head restraint 170 may themselves be adjustable, in other words, adjustable components within the seat back 160, the seat bottom 165, and/or the head restraint 170, and/or may be adjustable relative to each other.

The restraint system 105 includes the retractor 145, the webbing 140 retractably payable from the retractor 145, an anchor 175 coupled to the webbing 140, and a clip 180. The clip 180 may be adjustable along the webbing 140 and may selectively engage a buckle 185 fixed relative to the seat 155. The restraint system 105 is a vehicle safety device designed to secure an occupant against harmful movement that may result during a collision or a sudden stop.

Figure 2:
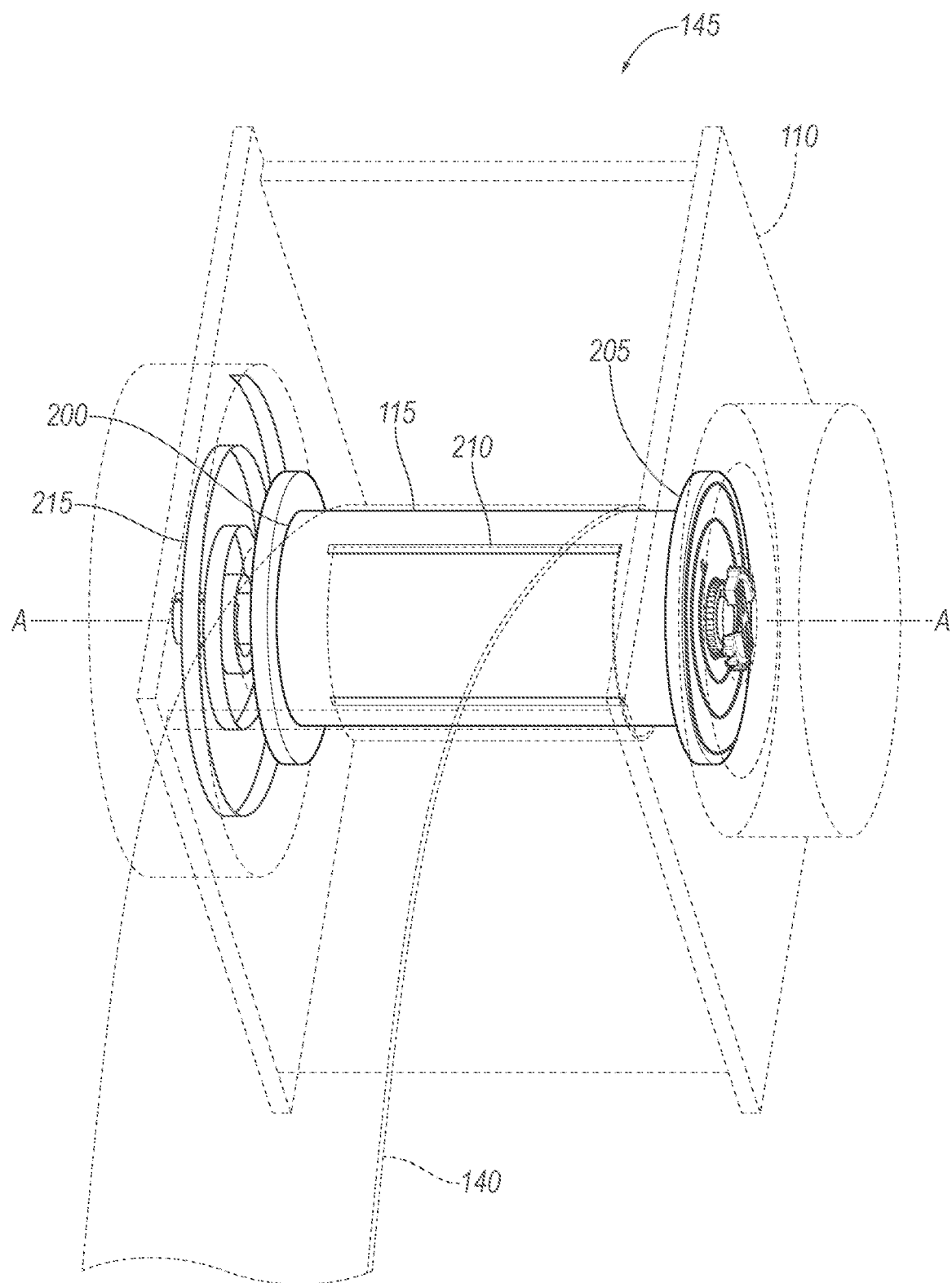
FIG. 2 is a perspective view of an example retractor of a restraint system of the vehicle.

The anchor 175 attaches one end of the webbing 140 relative to a vehicle body 190 of the vehicle 100, e.g., to the seat 155. The other end of the webbing 140 feeds into the retractor 145 and is attached to the spool 115, with the webbing 140 wound around the spool 115 beginning at that end (as shown in FIG. 2). The webbing 140 can be formed of a fabric in the shape of a strap. The clip 180 slides freely along the webbing 140 and, when engaged with the buckle 185, divides the webbing 140 into a lap band and a shoulder band.

The restraint system 105 of FIG. 1 is a three-point harness, meaning that the webbing 140 is attached at three points around the occupant when fastened. The restraint system 105 may, alternatively, include another arrangement of attachment points.

The retractor 145 can be attached to the vehicle body 190 of the vehicle 100, e.g., to a pillar 195, e.g., to a middle pillar in the instance the seat 155 is a front seat (as shown in FIG. 1), to a rear pillar when the seat 155 is a rear seat, etc. The retractor 145 may alternatively be mounted to the seat 155.

With reference to FIG. 2, the retractor 145 includes the retractor housing 110. The retractor housing 110 may be formed of metal or plastic. The retractor housing 110 may be mounted to the vehicle body 190 of the vehicle 100, e.g., to the pillar 195 or the seat 155.

The retractor 145 includes the spool 115. The spool 115 is rotatably coupled to the retractor housing 110. The spool 115 can freely rotate relative to the retractor housing 110, and is fixed to the retractor housing 110 in all other degrees of freedom. The spool 115 can be cylindrical in shape. The spool 115 defines the axis A, about which the spool 115 rotates. The spool 115 extends along the axis A from a first end 200 to a second end 205. The spool 115 includes flanges at the first end 200 and at the second end 205.

The spool 115 can be adapted to receive the webbing 140, for example, by including a slot 210 and permitting the webbing 140 to wind around an outside of the spool 115 starting from the slot 210. The slot 210 is elongated parallel to the axis A. The webbing 140 extends from outside the spool 115 through the slot 210. The webbing 140 extends from the slot 210 in a circumferential direction and is wound around the spool 115.

The retractor 145 includes a spring 215. The spring 215 is coupled to the spool 115 and to the retractor housing 110. The spring 215 is preloaded to apply a torque to the spool 115 in a retractive direction, i.e., a direction tending to retract the webbing 140. The spring 215 may be loaded in tension or compression when the webbing 140 is fully retracted, and the spring 215 may be further loaded in either tension or compression when the webbing 140 is extracted from the spool 115. Thus, the spring 215 exerts a torque in the retractive direction. The spring 215 may be a coil spring, which is suitable for rotational biasing and packages well in the retractor 145, or any other suitable type of spring.

Figure 3:
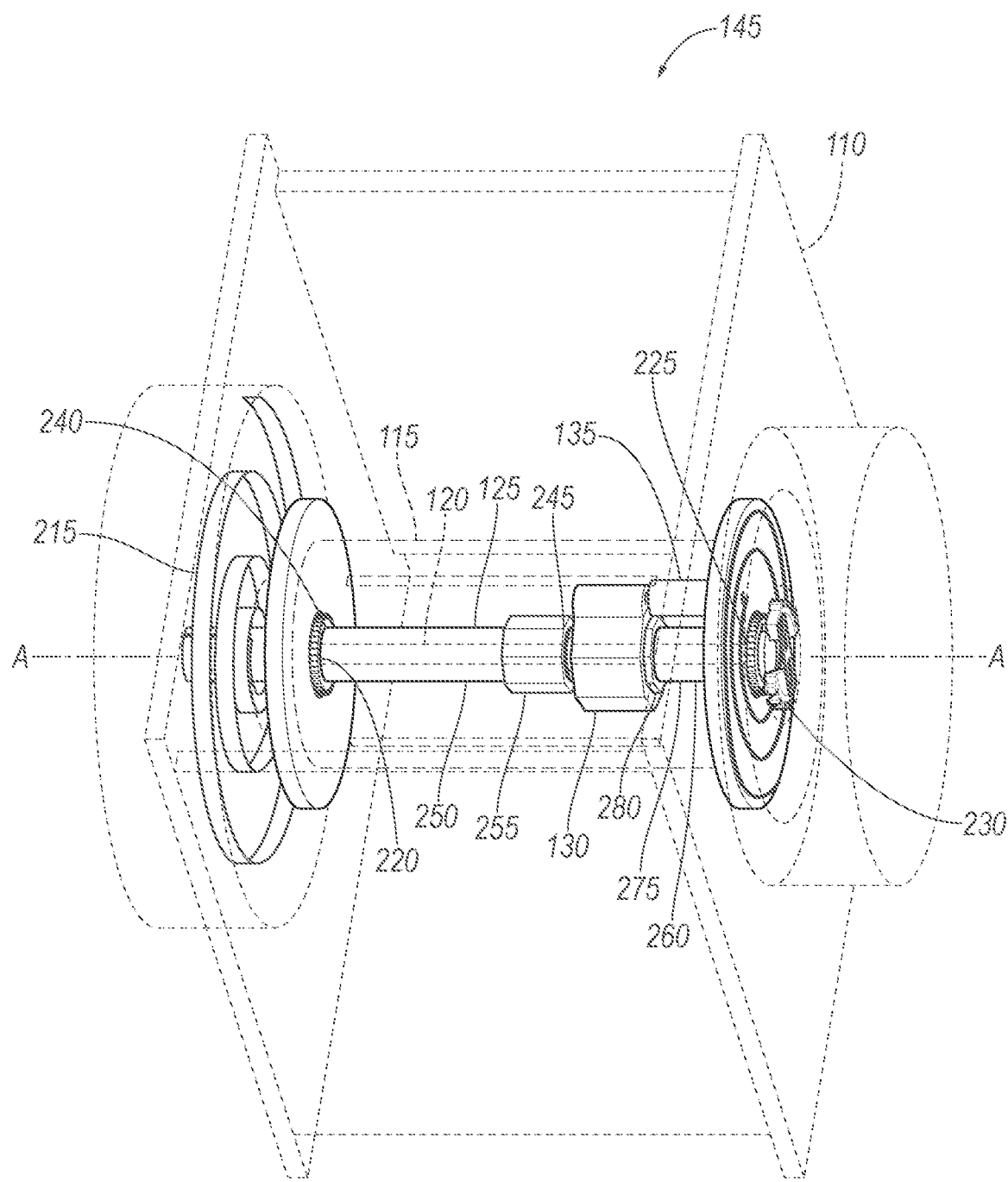
FIG. 3 is a perspective view of the retractor with the spool removed for illustration.

With reference to FIG. 3, the retractor 145 includes the inner torsion bar 120. The inner torsion bar 120 is elongated along the axis A from a first end 220 to a second end 225. The first end 220 of the inner torsion bar 120 is positioned axially at the first end 200 of the spool 115, and the second end 225 of the inner torsion bar 120 is positioned axially at the second end 205 of the spool 115. The inner torsion bar 120 is centered on the axis A. The inner torsion bar 120 is positioned coaxially and concentrically in the spool 115. The inner torsion bar 120 is a solid of revolution around the axis A, i.e., a solid figure obtained by rotating a plane curve around a straight line (in this case, the axis A) in the same plane as the plane curve, e.g., a solid cylinder.

The first end 220 of the inner torsion bar 120 is fixed relative to the spool 115. For example, the first end 220 of the inner torsion bar 120 can be attached, e.g., welded or keyed, to the first end 200 of the spool 115. The first end 220 of the inner torsion bar 120 is rotationally locked to the first end 200 of the spool 115 around the axis A. The inner torsion bar 120 is not attached to the spool 115 other than at the first end 220 of the inner torsion bar 120.

Figure 4:
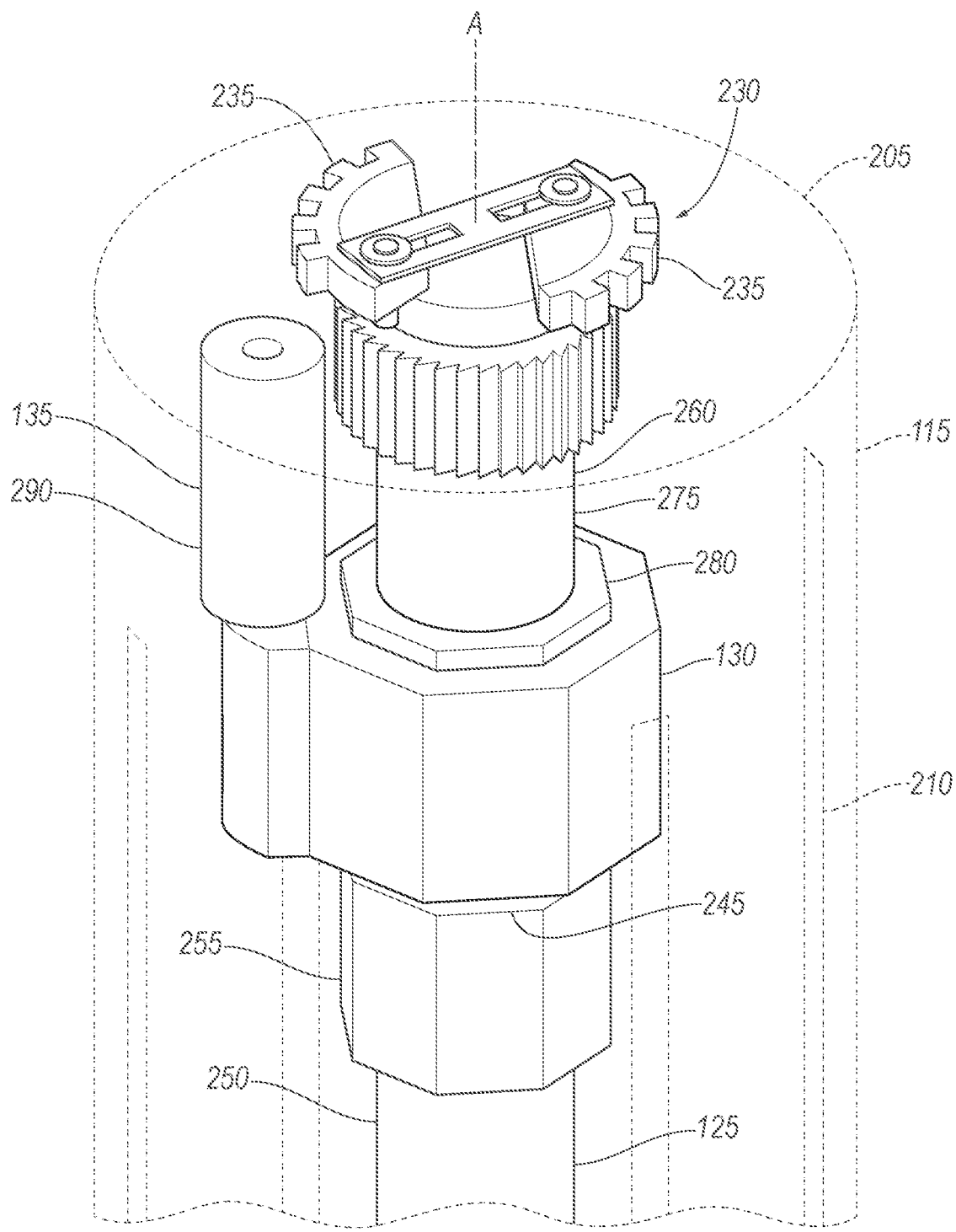
FIG. 4 is a perspective view of a portion of the retractor.

With reference to FIG. 4, the retractor 145 may be an emergency locking retractor (ELR). In such an example, the retractor 145 includes a locking mechanism 230 movable between an engaged state and a disengaged state. In the engaged state, the locking mechanism 230 locks the second end 225 of the inner torsion bar 120 to the retractor housing 110, i.e., fixing the second end 225 of the inner torsion bar 120 relative to the retractor housing 110. In the disengaged state, the locking mechanism 230 permits rotation of the second end 225 of the inner torsion bar 120 relative to the retractor housing 110. When the locking mechanism 230 is in the disengaged state, the inner torsion bar 120 is rotatable with the spool 115 relative to the retractor housing 110. For example, the locking mechanism 230 may include one or more locking members 235 slidingly or pivotally attached to the second end 225 of the inner torsion bar 120 to permit radially outward movement relative to the inner torsion bar 120. Each locking member 235 may include a plurality of teeth engageable with corresponding recesses of the retractor housing 110 (not shown) when the locking member 235 moves radially outward. The locking members 235 when engaged prevent rotational movement by the second end 225 of the inner torsion bar 120.

The retractor 145 may include an activation sensor (not shown) that senses sudden deceleration of the vehicle 100 and triggers activation of the locking mechanism 230 to engage the second end 225 of the inner torsion bar 120, i.e., to move the locking mechanism 230 from the disengaged state to the engaged state. The activation sensor may be in communication with the locking mechanism 230, either directly or indirectly through a controller (not shown). The activation sensor may be located in the retractor 145 or elsewhere in the vehicle 100. In the retractor 145, the activation sensor may be, for example, a weighted pendulum, a centrifugal clutch, or any other suitable type. In the vehicle 100 outside the retractor 145, the activation sensor may be, for example, post-contact sensors such as accelerometers, pressure sensors, and contact switches; pre-impact sensors such as radar, LIDAR, and vision-sensing systems; or any other suitable type. The vision systems may include one or more cameras, CCD image sensors, CMOS image sensors, etc.

Figure 5:
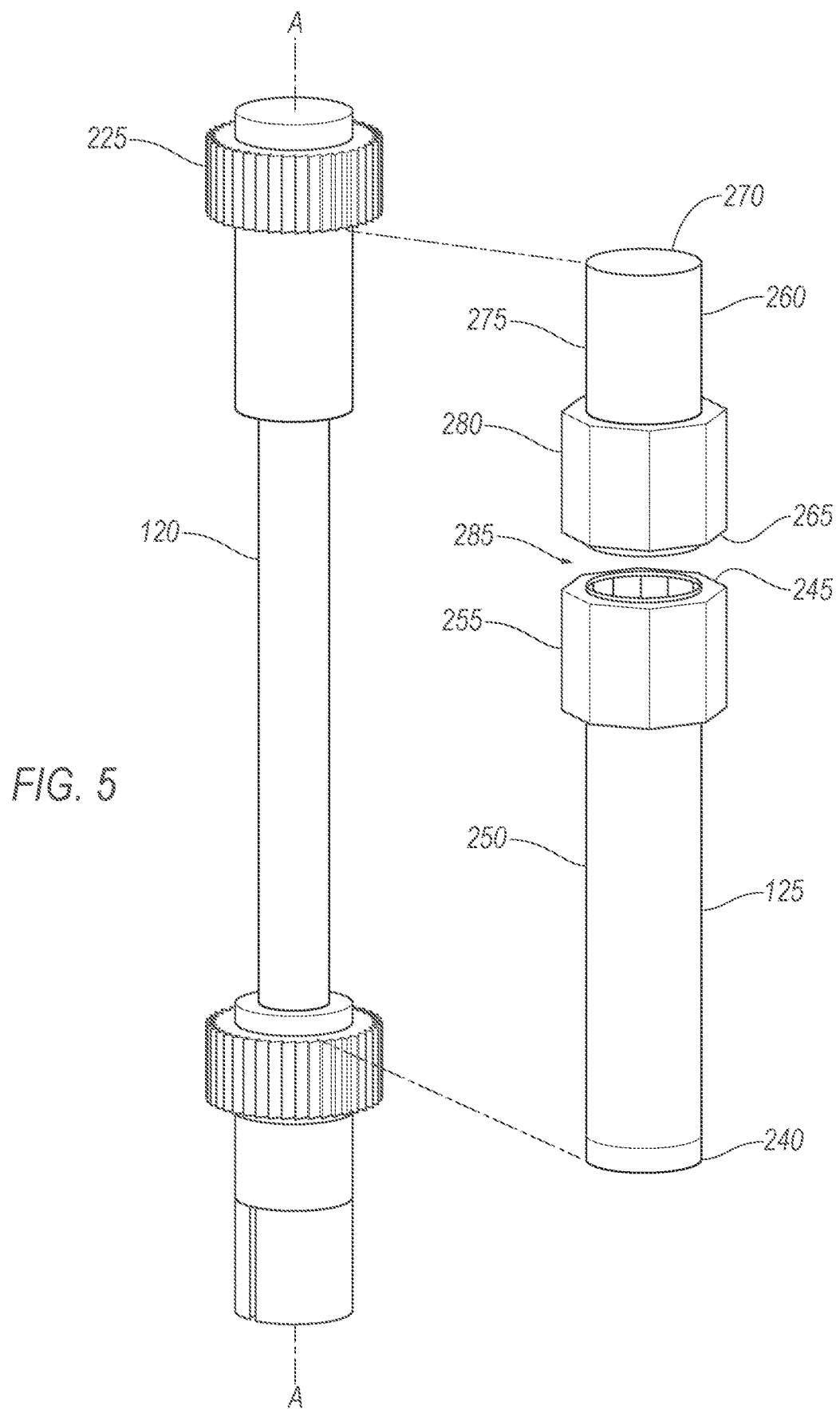
FIG. 5 is an exploded perspective view of an example inner torsion bar and outer torsion bars of the retractor.
Figure 6:
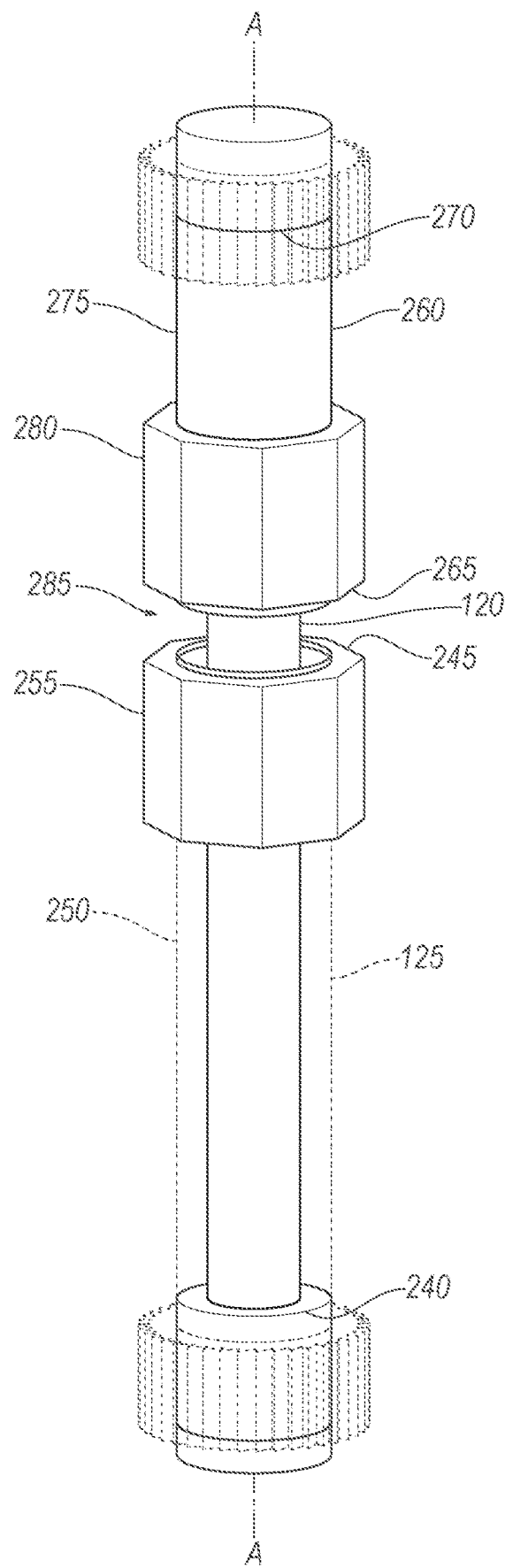
FIG. 6 is a perspective view of the inner torsion bar and outer torsion bars.

With reference to FIGS. 5-6, the retractor 145 includes the first outer torsion bar 125. The first outer torsion bar 125 is elongated along the axis A from a first end 240 to a second end 245. The first outer torsion bar 125 extends coaxially and concentrically around the inner torsion bar 120, and the first outer torsion bar 125 is positioned coaxially and concentrically in the spool 115 (as seen by comparing FIGS. 2 and 3). The first outer torsion bar 125 is fixed to the inner torsion bar 120 at the first end 220 of the inner torsion bar 120. For example, the first end 240 of the first outer torsion bar 125 is fixed to the first end 220 of the inner torsion bar 120, e.g., welded to the first end 220 of the inner torsion bar 120. When the engagement member 130 is disengaged, the first outer torsion bar 125 is unattached to other components of the retractor 145 except at the first end 240 of the first outer torsion bar 125. When the engagement member 130 is disengaged, the first end 240 of the first outer torsion bar 125 is free, i.e., unattached to other components.

The first outer torsion bar 125 has a generally tubular cylindrical shape with a bore extending fully therethrough along the axis A to accommodate the inner torsion bar 120. The first outer torsion bar 125 may have a nonengaging portion 250 with a cross-sectional shape orthogonal to the axis A of a circular wall of constant radial thickness, and the cross-sectional shape is projected along the axis A from the first end 240 toward the second end 245. The first outer torsion bar 125 may further have an engaging portion 255 with a cross-sectional shape orthogonal to the axis A of a noncircular outer surface, and the cross-sectional shape is projected along the axis A from the second end 245 toward the first end 240. The engaging portion 255 is shaped to engage with the engagement member 130, as described below.

The retractor 145 includes a second outer torsion bar 260. The second outer torsion bar 260 is elongated along the axis A from a first end 265 to a second end 270. The second outer torsion bar 260 extends coaxially and concentrically around the inner torsion bar 120, and the second outer torsion bar 260 is positioned coaxially and concentrically in the spool 115 (as seen by comparing FIGS. 2 and 3). The second outer torsion bar 260 is fixed to the inner torsion bar 120 at the second end 225 of the inner torsion bar 120. For example, the second end 270 of the second outer torsion bar 260 is fixed to the second end 225 of the inner torsion bar 120, e.g., welded to the second end 225 of the inner torsion bar 120. When the engagement member 130 is disengaged, the first end 265 of the second outer torsion bar 260 is free, i.e., unattached to other components, except for the engagement member 130.

The second outer torsion bar 260 has a generally tubular cylindrical shape with a bore extending fully therethrough along the axis A to accommodate the inner torsion bar 120. The second outer torsion bar 260 may have a nonengaging portion 275 with a cross-sectional shape orthogonal to the axis A of a circular wall of constant radial thickness, and the cross-sectional shape is projected along the axis A from the second end 270 toward the first end 265. The second outer torsion bar 260 may further have an engaging portion 280 with a cross-sectional shape orthogonal to the axis A of a noncircular outer surface, and the cross-sectional shape is projected along the axis A from the first end 265 toward the second end 270. The engaging portion 280 is shaped to engage with the engagement member 130, as described below.

The first outer torsion bar 125 extends coaxially with the inner torsion bar 120 along a section of the inner torsion bar 120 starting at the first end 220 of the inner torsion bar 120 toward the second end 225 of the inner torsion bar 120, and the second outer torsion bar 260 extends coaxially with the inner torsion bar 120 along a different, nonoverlapping section of the inner torsion bar 120 starting at the second end 225 of the inner torsion bar 120 toward the first end 220 of the inner torsion bar 120. The first outer torsion bar 125 and the second outer torsion bar 260 define a gap 285 between the first outer torsion bar 125 and the second outer torsion bar 260 along the axis A, i.e., the inner torsion bar 120 includes a section axially between the first outer torsion bar 125 and the second outer torsion bar 260 around which neither the first outer torsion bar 125 nor the second outer torsion bar 260 coaxially extend.

Figure 7:
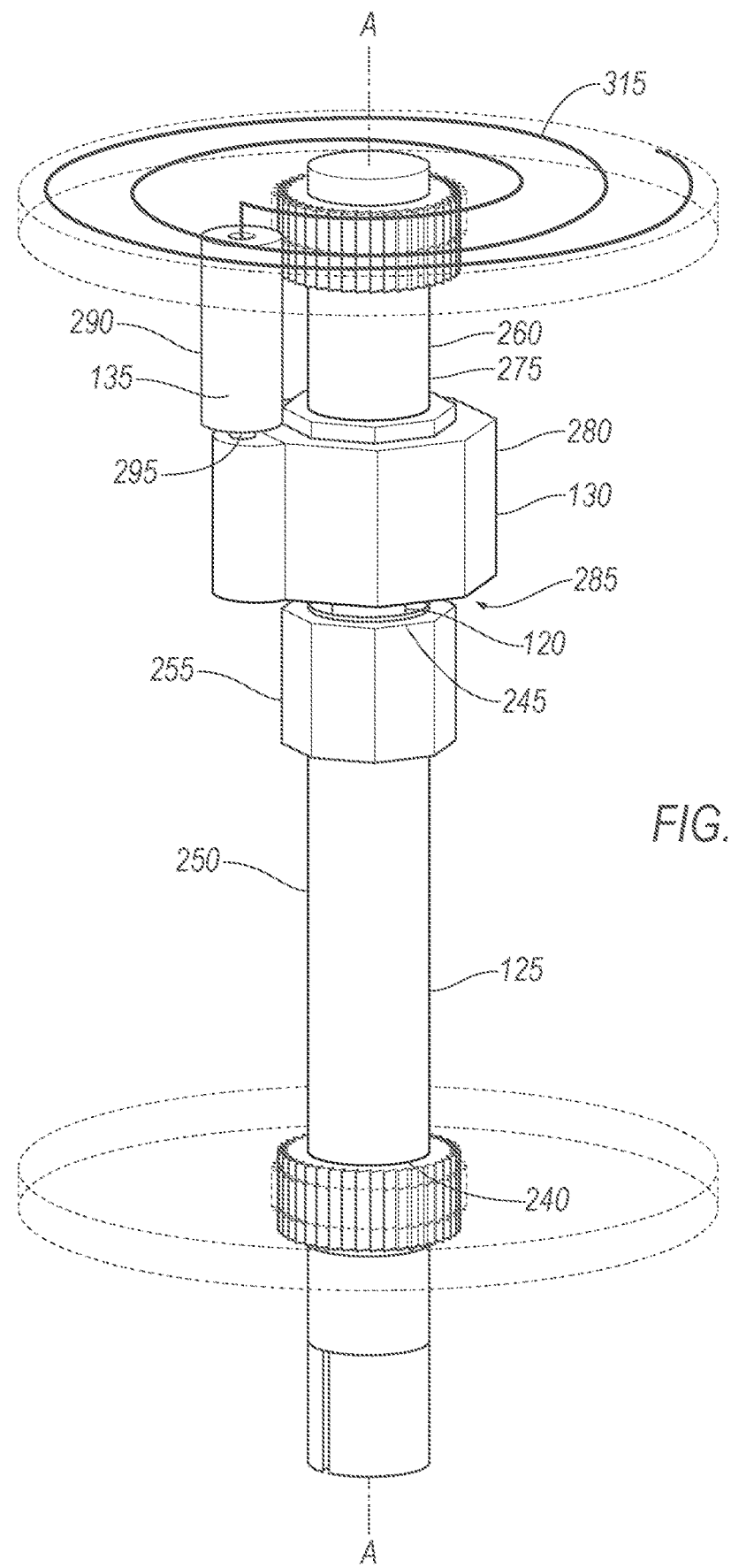
FIG. 7 is a perspective view of the inner torsion bar, the outer torsion bars, a solenoid, and an engagement member of the retractor with the engagement member in a disengaged position.
Figure 8:
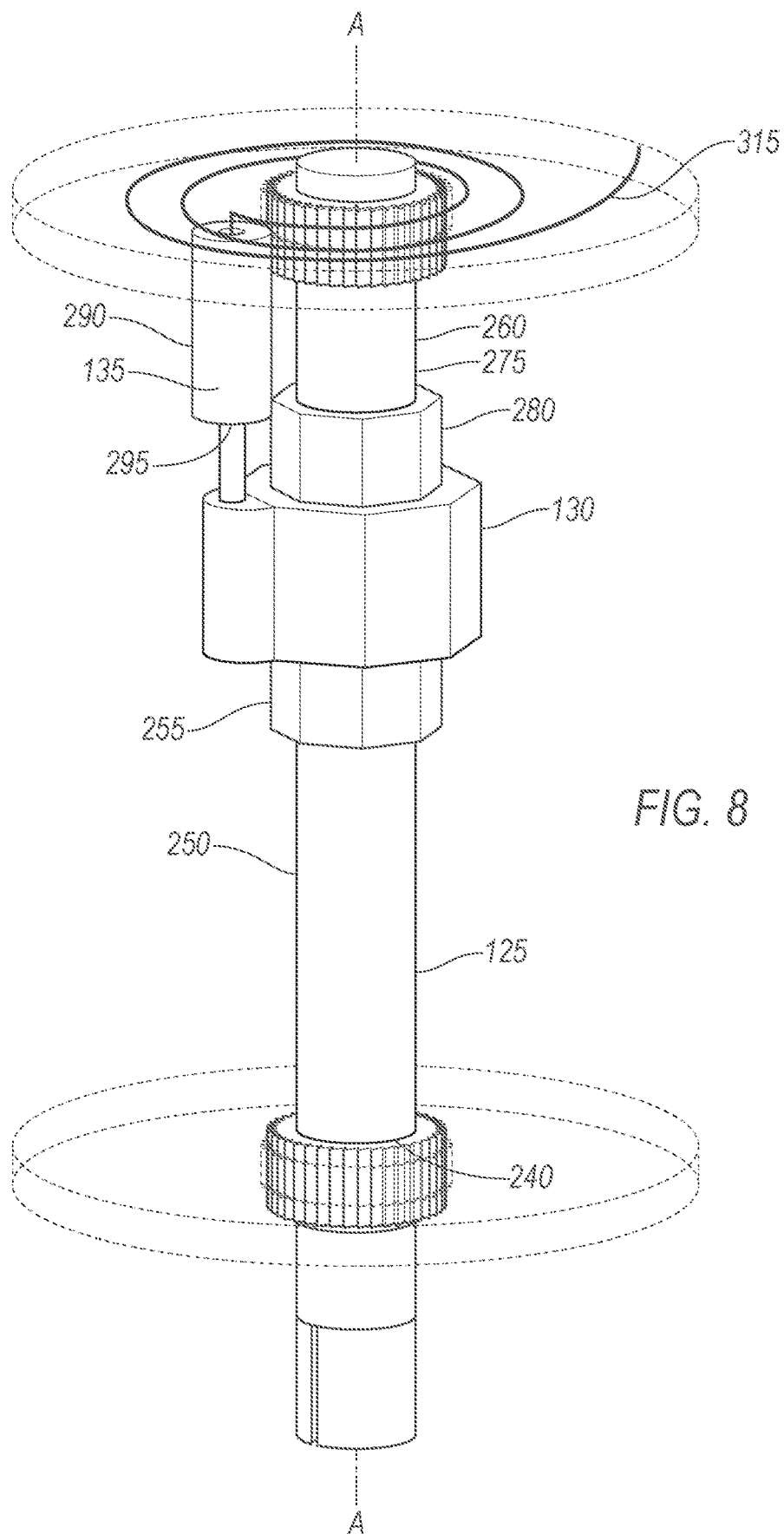
FIG. 8 is a perspective view of the inner torsion bar, the outer torsion bars, the solenoid, and the engagement member with the engagement member in an engaged position.

With reference to FIGS. 7-8, the retractor 145 includes the engagement member 130. The engagement member 130 is selectively engageable with the first outer torsion bar 125, i.e., is movable between a disengaged position in which the engagement member 130 is not engaged with the first outer torsion bar 125 (as shown in FIG. 7) and an engaged position in which the engagement member 130 is engaged with the first outer torsion bar 125 (as shown in FIG. 8). When the engagement member 130 is engaged with the first outer torsion bar 125, the engagement member 130 connects the second end 245 of the first outer torsion bar 125 to the second end 225 of the inner torsion bar 120, e.g., via the second outer torsion bar 260. Thus, when the engagement member 130 is disengaged from the first outer torsion bar 125, the inner torsion bar 120 alone twists in a load-limiting situation because the second end 245 of the first outer torsion bar 125 is free, and when the engagement member 130 is engaging the first outer torsion bar 125, the first outer torsion bar 125 twists with the inner torsion bar 120 in a load-limiting situation. For example, the engagement member 130 may selectively engage the first outer torsion bar 125 with the second outer torsion bar 260, e.g., by extending across the gap 285 when engaging the first outer torsion bar 125 with the second outer torsion bar 260, thereby connecting the second end 245 of the first outer torsion bar 125 to the first end 265 of the second outer torsion bar 260. Thus, when the engagement member 130 is engaging the first outer torsion bar 125 with the second outer torsion bar 260, the first outer torsion bar 125 and the second outer torsion bar 260 as a unit twist with the inner torsion bar 120 to in a load-limiting situation.

The engagement member 130 and the first outer torsion bar 125, e.g., the engaging portion 255 at the second end 245 of the first outer torsion bar 125, are shaped to prevent rotation of the second end 245 of the first outer torsion bar 125 relative to the engagement member 130 when the engagement member 130 is engaged with the first outer torsion bar 125. For example, an inner surface of the engagement member 130 and the outer surface of the engaging portion 255 of the first outer torsion bar 125 may have matching noncircular cross-sectional shapes, thus preventing rotation of one relative to the other when engaged, i.e., the engaging portion 255 is keyed for the engagement member 130. In the example of the Figures, the cross-sectional shape is a hexagon, but other noncircular shapes may be chosen. Similarly, the engagement member 130 and the second outer torsion bar 260, e.g., the engaging portion 280 at the first end 265 of the second outer torsion bar 260, are shaped to prevent rotation of the engagement member 130 relative to the second outer torsion bar 260. For example, the inner surface of the engagement member 130 and the outer surface of the engaging portion 280 of the second outer torsion bar 260 may have matching noncircular cross-sectional shapes, thus preventing rotation of one relative to the other when engaged, i.e., the engaging portion 280 is keyed for the engagement member 130. In the example of the Figures, the cross-sectional shape is a hexagon, but other noncircular shapes may be chosen.

The retractor 145 includes the solenoid 135. The solenoid 135 is operable to move the engagement member 130 into engagement with the first outer torsion bar 125 and out of engagement with the first outer torsion bar 125. The solenoid 135 includes a solenoid housing 290 and a plunger 295. Electrical current through the solenoid housing 290 generates a magnetic field, and the plunger 295 moves in response to changes in the magnetic field. The solenoid 135 moves the plunger 295 between a position in which the engagement member 130 is engaged with the first outer torsion bar 125 and a position in which the engagement member 130 is disengaged from the first outer torsion bar 125. The engagement member 130 may be engaged with the second outer torsion bar 260 in both positions.

The solenoid 135, e.g., the solenoid housing 290, is fixed relative to the spool 115, e.g., is fixed to a flange of the spool 115. The solenoid 135 is arranged to move the engagement member 130 parallel to the axis A. For example, the engagement member 130 is fixed to the plunger 295, and the plunger 295 is arranged to be slidable within the solenoid housing 290 parallel to the axis A according to the magnetic field applied to the plunger 295. The solenoid 135 is supplied by a solenoid wire 315 that is coiled around the axis A to supply sufficient slack for the rotation of the solenoid 135 about the axis A with the spool 115.

Figure 9:
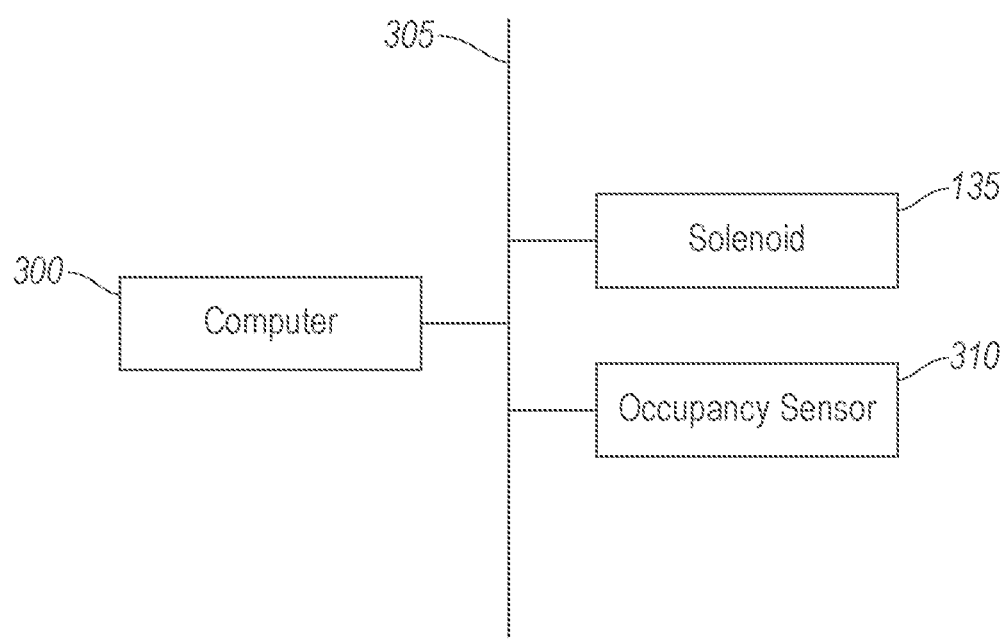
FIG. 9 is a block diagram of an example control system for the retractor.

With reference to FIG. 9, the restraint system 105 includes a computer 300. The computer 300 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 300 can thus include a processor, a memory, etc. The memory of the computer 300 can include media for storing instructions executable by the processor as well as for electronically storing data and/or databases, and/or the computer 300 can include structures such as the foregoing by which programming is provided. The computer 300 can be multiple computers coupled together.

The restraint system 105 includes a communications network 305. The computer 300 may transmit and receive data through the communications network 305. The communications network 305 may be, e.g., a controller area network (CAN) bus, Ethernet, WiFi, Local Interconnect Network (LIN), onboard diagnostics connector (OBD-II), and/or any other wired or wireless communications network. The computer 300 may be communicatively coupled to the solenoid 135, an occupancy sensor 310, and other components via the communications network 305.

The occupancy sensor 310 is configured to detect occupancy of the seat 155. The occupancy sensor 310 may be a visible-light or infrared camera directed at the seat 155, a weight sensor inside the seat 155, a sensor detecting whether the clip 180 of the restraint system 105 is buckled in the buckle 185, or another suitable sensor.

The computer 300 is programmed to instruct the solenoid 135 to move the engagement member 130 into engagement with the first outer torsion bar 125 in response to data indicating that an occupant of the seat 155 is above a size threshold, e.g., a stature threshold or height threshold. The data may be received from the occupancy sensor 310 via the communications network 305. The size threshold may be chosen to indicate an occupant for which a lower maximum load is desired and for which greater forward travel is acceptable during certain impacts (e.g., because the occupant is shorter), e.g., a fifth-percentile adult woman or a fiftieth-percentile six-year-old.

When an occupant sits in the seat 155, the computer 300 receives the data from the occupancy sensor 310 and instructs the solenoid 135 to move the engagement member 130 into or out of engagement with the first outer torsion bar 125, depending on the size, e.g., stature, of the occupant. In the event of certain sudden decelerations of the vehicle 100, the locking mechanism 230 moves from the disengaged state to the engaged state, which locks the second end 225 of the inner torsion bar 120 relative to the retractor housing 110. (Other components may also be activated, such as airbags or pretensioners.) Force from the occupant's torso pulls on the shoulder band, which exerts a force on the webbing 140 tending to extract the webbing 140 from the retractor 145, i.e., unwind the spool 115, i.e., exert a torque on the spool 115 in an extractive direction. The extractive torque on the spool 115 causes the spool 115 and the first end 220 of the inner torsion bar 120 to rotate in the extractive direction, and the locking mechanism 230 in the engaged state causes the second end 225 of the inner torsion bar 120 to remain stationary instead of rotating with the spool 115. If the engagement member 130 is not engaged with the first outer torsion bar 125, the first outer torsion bar 125 rotates freely with the first end 220 of the inner torsion bar 120 and does not provide any resistance to the rotation of the spool 115. Thus, only the inner torsion bar 120 provides resistance to the rotation of the spool 115. If the engagement member 130 is engaged with the first outer torsion bar 125, the first end 240 of the first outer torsion bar 125 rotates with the first end 220 of the inner torsion bar 120, and the second end 270 of the second outer torsion bar 260, to which the first outer torsion bar 125 is connected, remains stationary with the second end 225 of the inner torsion bar 120. Thus, both the inner torsion bar 120 and the unit of the first outer torsion bar 125 and the second outer torsion bar 260 provide resistance to the rotation of the spool 115, thereby providing a greater level of resistance.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. Operations, systems, and methods described herein should always be implemented and/or performed in accordance with an applicable owner's/user's manual and/or safety guidelines.

What is claimed is:

1. A restraint system comprising:
a retractor housing;
a spool rotatably coupled to the retractor housing and defining an axis of rotation;
an inner torsion bar elongated along the axis of rotation and positioned coaxially in the spool;
a first outer torsion bar elongated along the axis of rotation, extending coaxially around the inner torsion bar, and positioned coaxially in the spool;
an engagement member selectively engageable with the first outer torsion bar;
a second outer torsion bar elongated along the axis of rotation, extending coaxially around the inner torsion bar, and positioned coaxially in the spool; and
a solenoid operable to move the engagement member into engagement with the first outer torsion bar and out of engagement with the first outer torsion bar.

2. The restraint system of claim 1, wherein the engagement member selectively engages the first outer torsion bar with the second outer torsion bar.

3. The restraint system of claim 2, wherein the first outer torsion bar and the second outer torsion bar define a gap between the first outer torsion bar and the second outer torsion bar along the axis of rotation, and the engagement member extends across the gap when engaging the first outer torsion bar with the second outer torsion bar.

4. The restraint system of claim 2, wherein the engagement member and the second outer torsion bar are shaped to prevent rotation of the engagement member relative to the second outer torsion bar.

5. The restraint system of claim 4, wherein the engagement member and the first outer torsion bar are shaped to prevent rotation of an end of the first outer torsion bar relative to the engagement member when the engagement member is engaged with the first outer torsion bar.

6. The restraint system of claim 1, wherein the inner torsion bar is elongated from a first end to a second end, the first outer torsion bar is fixed to the inner torsion bar at the first end, and the second outer torsion bar is fixed to the inner torsion bar at the second end.

7. The restraint system of claim 1, wherein the solenoid is fixed relative to the spool.

8. The restraint system of claim 1, wherein the solenoid is arranged to move the engagement member parallel to the axis of rotation.

9. The restraint system of claim 1, further comprising a computer communicatively coupled to the solenoid, wherein the computer is programmed to instruct the solenoid to move the engagement member into engagement with the first outer torsion bar in response to data indicating that an occupant of a seat is above a size threshold.

10. The restraint system of claim 1, wherein the inner torsion bar is elongated from a first end to a second end, and the first outer torsion bar is fixed to the inner torsion bar at the first end of the inner torsion bar.

11. The restraint system of claim 10, wherein the first outer torsion bar is elongated from a first end fixed to the first end of the inner torsion bar to a second end, and the second end of the first outer torsion bar is free when the engagement member is not engaged with the first outer torsion bar.

12. The restraint system of claim 11, wherein, when the engagement member is engaged with the first outer torsion bar, the engagement member connects the second end of the first outer torsion bar to the second end of the inner torsion bar.

13. The restraint system of claim 11, wherein the engagement member and the second end of the first outer torsion bar are shaped to prevent rotation of the second end of the first outer torsion bar relative to the engagement member when the engagement member is engaged with the first outer torsion bar.

14. The restraint system of claim 1, wherein the inner torsion bar is elongated from a first end to a second end, and the first end of the inner torsion bar is fixed relative to the spool.

15. The restraint system of claim 14, further comprising a locking mechanism movable between an engaged state and a disengaged state, wherein the locking mechanism in the engaged state locks the second end of the inner torsion bar to the retractor housing, and the locking mechanism in the disengaged state permits rotation of the second end of the inner torsion bar relative to the retractor housing.

16. The restraint system of claim 1, wherein the spool includes a slot, the restraint system further comprising webbing extending through the slot.

17. The restraint system of claim 1, further comprising a spring coupled to the spool and coupled to the retractor housing, wherein the spring is a coil spring.

18. The restraint system of claim 1, further comprising a spring coupled to the spool and coupled to the retractor housing, wherein the spring is preloaded to apply a torque to the spool in a retractive direction.

19. A restraint system comprising:
a retractor housing;
a spool rotatably coupled to the retractor housing and defining an axis of rotation;
an inner torsion bar elongated along the axis of rotation and positioned coaxially in the spool;
an outer torsion bar elongated along the axis of rotation, extending coaxially around the inner torsion bar, and positioned coaxially in the spool;
an engagement member selectively engageable with the outer torsion bar; and
a solenoid operable to move the engagement member into engagement with the outer torsion bar and out of engagement with the outer torsion bar;
wherein the solenoid is directly fixed to the spool.

\* \* \* \* \*